United States Patent [19]

Levavi

[11] Patent Number: 4,717,164

[45] Date of Patent: Jan. 5, 1988

[54] ROAD VEHICLE INCLUDING BANKING, STEERING, BRAKING AND OTHER CONTROLS

[76] Inventor: Shmuel Levavi, Keren Kayemet Leyisrael St. 18, Givatayim, Israel

[21] Appl. No.: 867,020

[22] Filed: May 27, 1986

[51] Int. Cl.⁴ ............................................. B60G 21/00
[52] U.S. Cl. ................................ 280/112 A; 180/210; 188/317; 297/8
[58] Field of Search ............... 180/219, 210; 280/210, 280/112 A, 703; 297/8 R; 188/316, 317

[56] References Cited

U.S. PATENT DOCUMENTS

| | | | |
|---|---|---|---|
| 4,277,076 | 7/1981 | Hanna | 280/112 A |
| 4,351,410 | 9/1982 | Townsend | 280/112 A |
| 4,360,224 | 11/1982 | Sato et al. | 280/112 A |
| 4,398,741 | 8/1983 | Hiramatsu | 180/219 |
| 4,632,413 | 12/1986 | Fujita et al. | 280/112 A |

Primary Examiner—John J. Love
Assistant Examiner—Donn McGiehan
Attorney, Agent, or Firm—Benjamin J. Barish

[57] ABSTRACT

A road vehicle, particularly a human-powered type, comprises a rotatable chassis section rotatable with respect to a fixed chassis section, a steering mechanism and a banking mechanism controlled by the steering mechanism for automatically rotating the rotatable chassis section with respect to the fixed chassis section about the horizontal axis whenever the steering mechanism is actuated to steer the vehicle. The vehicle also comprises a novel hydraulic shock absorber and a novel hydraulic rear-wheel suspension, both of which are influenced, e.g., stiffened or loosened, according to the load applied to the vehicle.

30 Claims, 19 Drawing Figures

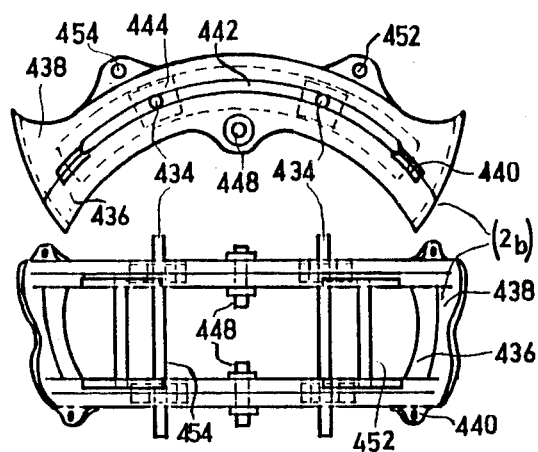
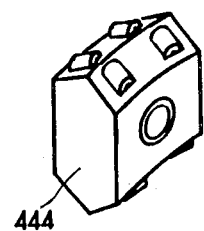
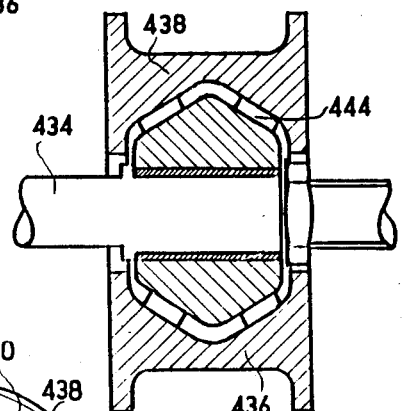
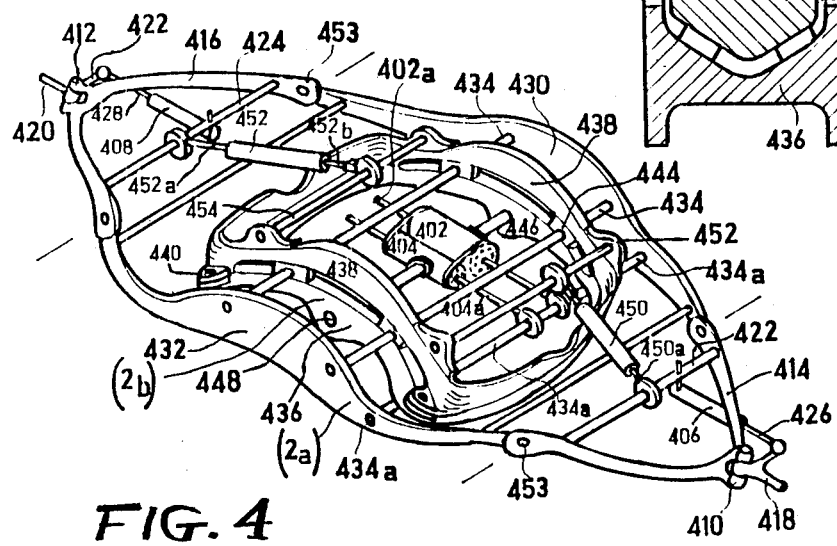
FIG. 5  FIG. 8  FIG. 6  FIG. 7  FIG. 4

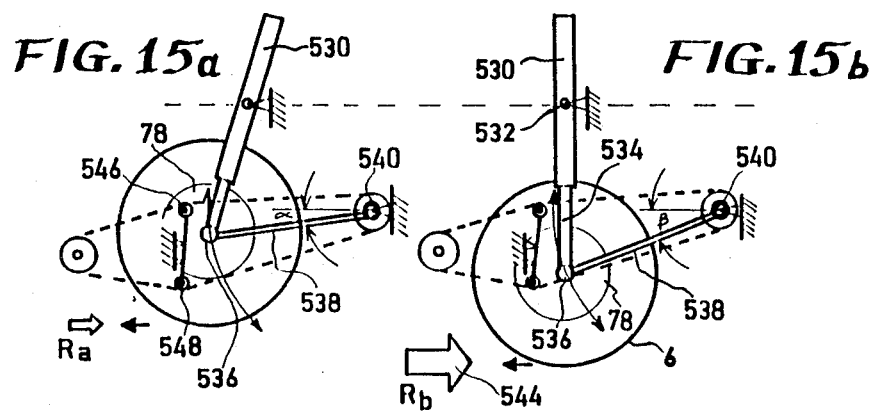
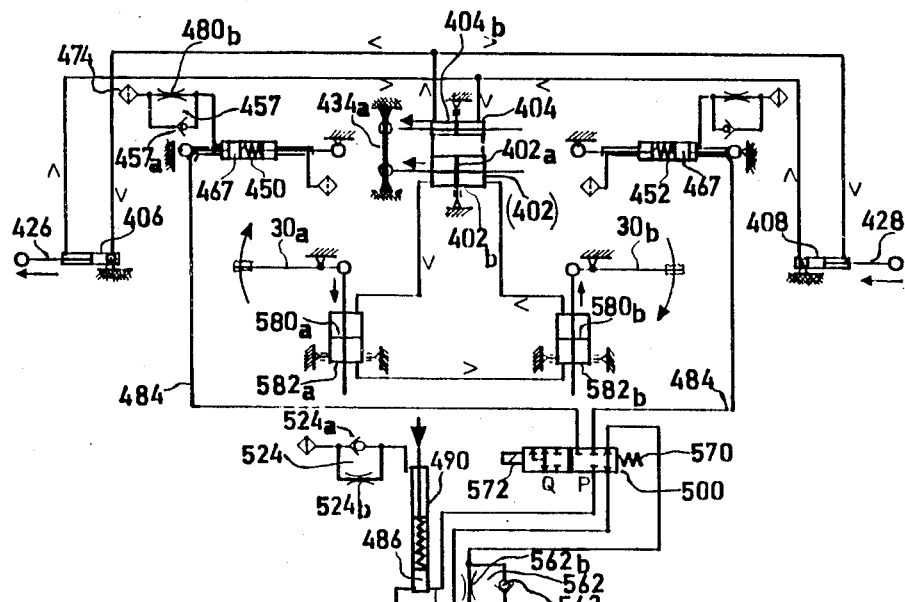
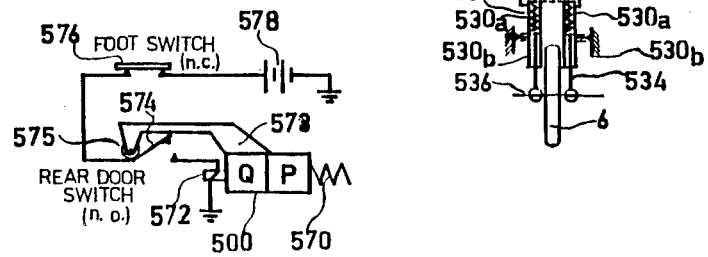

4,717,164

ROAD VEHICLE INCLUDING BANKING, STEERING, BRAKING AND OTHER CONTROLS

RELATED APPLICATIONS

The present application is related to my prior application Ser. No.06/809,387 filed Dec. 16, 1985, and to my subsequently-filed application Ser. No.07/017,097 filed Feb. 20, 1987.

BACKGROUND OF THE INVENTION

The present invention relates to road vehicles, and particularly to banking, steering, braking and/or other controls of such vehicles. The invention is especially useful in human-powered vehicles of the type described in my patent application Ser. No. 06/809,387 filed Dec. 16, 1985 and is therefore described below with respect to this type of vehicle, but it will be appreciated that the invention, and various features thereof, could advantageously be used in many other types of vehicles, including the powered type.

Many types of arrangements have been proposed for automatically banking or tilting the vehicle chassis when the steering wheel of the vehicle is turned, in order to increase the vehicle stability. Such banking arrangements are particularly desirable in three wheeled vehicles. One such arrangement, as described in U.S. Pat. No. 4,132,435, supports the front of the vehicle frame on two front wheels by means of a king pin pivot having an axis generally in the longitudinal plane of the frame and inclined with the upper end of the king pin forward of the lower end, whereby the frame automatically tilts from the vertical in the direction of steering of the front wheels. Another known arrangement, as described in British patent No. 1,561,253, includes a foot resting platform on each side of the frame arranged so that the operator, by leaning and applying a force by one of his feet to the platform on one side of the vehicle, may bank the vehicle and its wheels in the direction of steering.

An object of the present invention is to provide a new arrangement for banking or tilting the vehicle chassis in the direction in which the steered wheels are turned in order to increase the stability of the vehicle. Banking the vehicle while turning is particularly advantageous in human-powered vehicles in order to conserve energy by avoiding braking during turning.

Another object of the invention is to provide a novel shock absorbing arrangement, and also a novel rear suspension arrangement, for vehicles in which the shock absorber and/or suspension is influenced, e.g., stiffened or loosened, according to the weight of the rear occupant or other load applied to the vehicle wheels.

A further object of the invention is to provide a novel hydraulic suspension for the rear wheel of the vehicle effective, when the vehicle is braked, to lower the vehicle wheel with respect to the vehicle body, and thereby to better assure contact of the wheel with the pavement during the braking action.

BRIEF SUMMARY OF THE INVENTION

According to a broad aspect of the present invention, there is provided a road vehicle including a chassis supported by at least three wheels, at least one of which is a steered wheel and at least one of which is a non-steered wheel. The chassis includes a fixed chassis section and a rotatable chassis section rotatable with respect to the fixed section about a horizontal axis parallel to the longitudinal axis of the vehicle. The steered wheel is carried by the fixed chassis section and is turnably mounted about a substantially vertical axis thereof. The non-steered wheel is carried by the rotatable chassis section. The vehicle further includes steering control means for turning the steered wheel about the vertical axis; and banking means controlled by the steering control means for automatically rotating the rotatable chassis section, and the non-steered wheel carried thereby, with respect to the fixed chassis section in a predetermined direction about the horizontal axis whenever the steered wheel is turned to steer the vehicle.

According to an important feature in the preferred embodiment of the invention described below, the steering control means comprises a steering actuator coupled between the fixed chassis section and the steered wheel; and the banking means comprises a banking control actuator coupled between the fixed chassis section and the rotatable chassis section. In the described preferred embodiment, both of the above-mentioned actuators are hydraulic actuators.

According to a further aspect of the invention, there is provided a vehicle having a shock absorber including a spring engageable with a displaceable member for varying the force of the spring, and having an expansible liquid chamber for moving the displaceable member to vary the spring force; a liquid reservoir supplying liquid to the liquid chamber of the shock absorber to preset the displaceable member and thereby the spring force; and a seat effective to vary the spring force of the shock absorber according to the weight on the seat.

According to a still further aspect, there is provided a vehicle including a rear wheel having a hydraulic suspension, and a lever arm extending rearwardly of the rear wheel at an acute angle to the horizontal axis of the vehicle, the front end of the lever arm being pivotably mounted to the axis of the rear wheel, and the rear end of the lever arm being pivotably mounted to the vehicle at a point above the axis of the rear wheel, such that during the braking of the vehicle, the reaction forces pivot the rear wheel and its hydraulic suspension in the direction increasing said acute angle, thereby lowering the rear wheel with respect to the vehicle body.

Further features and advantages of the invention will be apparent from the description below.

BRIEF DESCRIPTION OF THE DRAWINGS

The invention is herein described, by way of example only, with reference to the accompanying drawings, wherein:

FIG. 4 is an enlarged three-dimensional view illustrating the main components of the steering and banking arrangement in the vehicle of FIGS. 1-3;

FIGS. 5 and 6 are front and top views, respectively, illustrating the main components of the banking arrangement of FIG. 4;

FIGS. 7 and 8 are views illustrating details in the banking arrangement of FIGS. 4-6;

FIGS. 15a and 15b are diagrams helpful in explaining the operation of the rear wheel suspension system during a braking operation;

FIG. 16 is a hydraulic circuit diagram illustrating the overall operation of the vehicle; and FIG. 17 is an electrical circuit diagram illustrating an electrical control in the hydraulic circuit.

DESCRIPTION OF A PREFERRED EMBODIMENT

Figure 1:
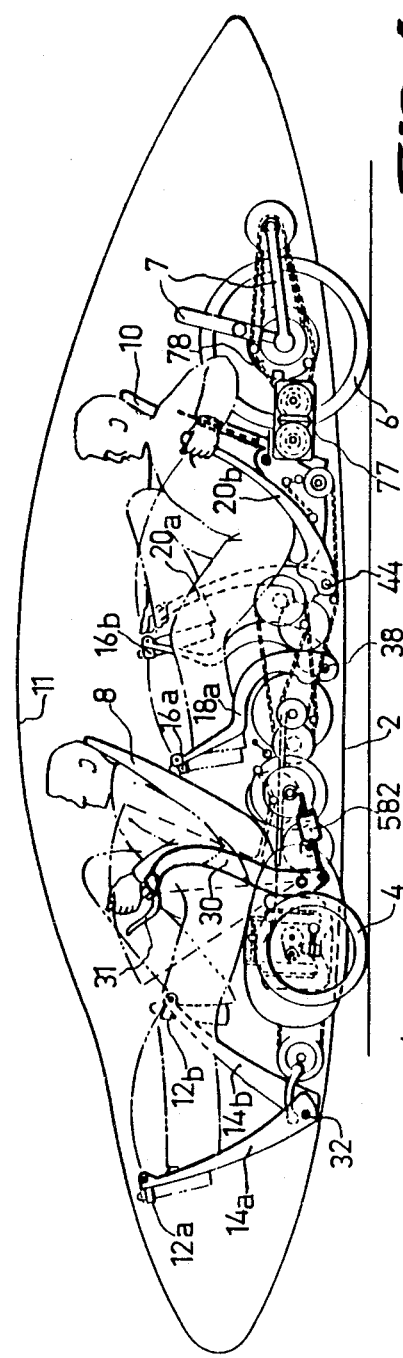
FIG. 1 is a schematical side view illustrating one form of vehicle constructed in accordance with the present invention.
Figure 2:
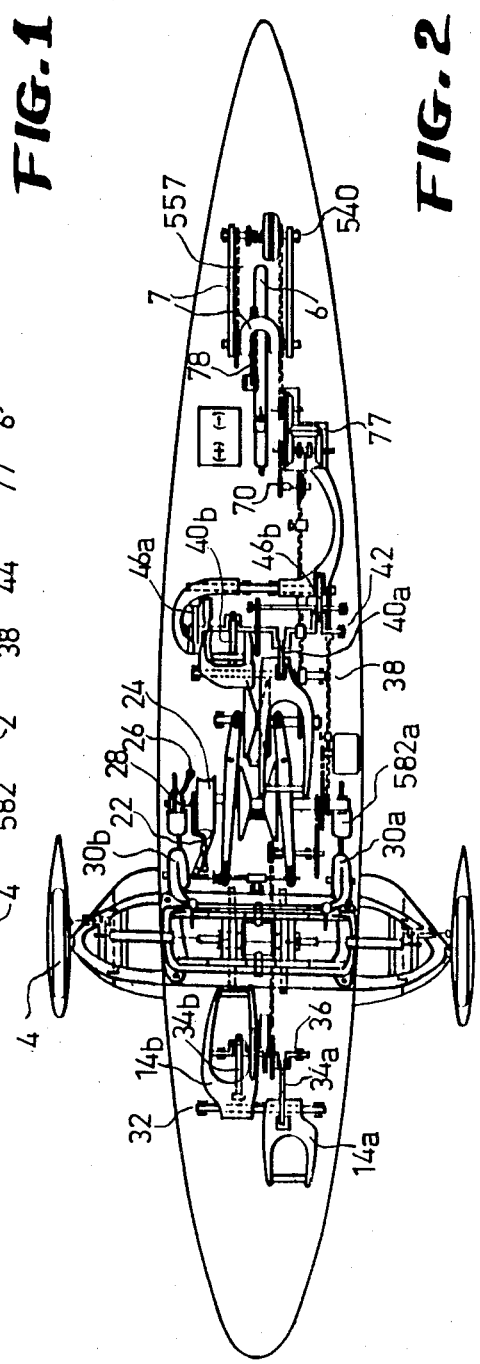
FIG. 2 is a schematical top plan view of the vehicle of FIG. 1.
Figure 3:
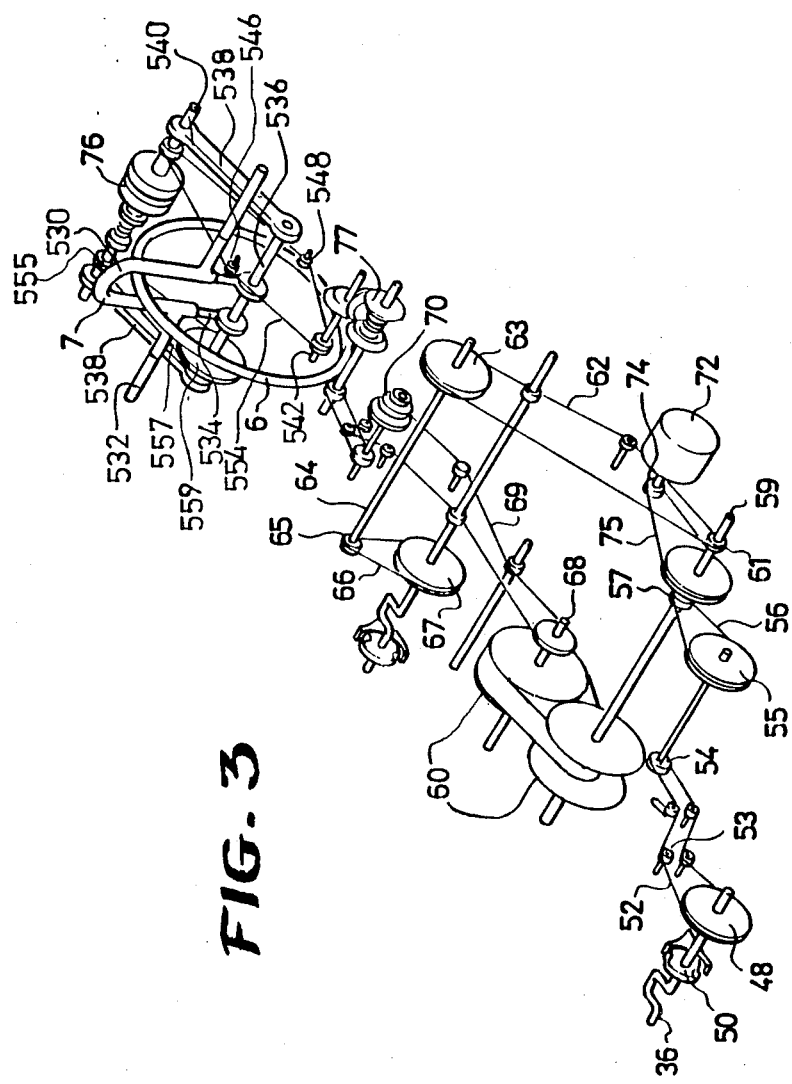
FIG. 3 is a three-dimensional schematical view illustrating the main components of the transmission in the vehicle of FIGS. 1 and 2.

Overall Construction (FIGS. 1–3)

The vehicle illustrated in FIGS. 1–3 of the drawings is a human-powered road vehicle having the same basic construction as described my above-cited patent applications Ser. No. 06/809387 filed Dec. 16, 1985 and Ser. No.07/017,097 filed Feb. 20, 1987. It comprises a frame, generally designated 2, supported on a pair of front wheels 4 and a single rear wheel 6 mounted on a rear suspension 7. Fixed on chassis 2 are a front seat 8 for supporting a front occupant in a supine position (FIG. 1) at the front end of the chassis facing the front wheels, and a rear seat 10 for supporting a rear occupant also in a supine position behind the front seat and also facing the front wheels. An outer shell 11 carried by the chassis encloses these two seats.

The vehicle is propelled by the following: a pair of foot pedals 12a, 12b pivotably mounted at the end of levers 14a, 14b for operation by the front occupant; a similar pair of foot pedals 16a, 16b pivotably mounted at the ends of levers 18a, 18b operated by the rear occupant; and a pair of hand levers 20a, 20b operated by the rear occupant. Control of the vehicle is effected by a hand lever 22 coupled to a control drum 24, by a second hand lever 26 coupled to a control disc 28, by a pair of steering levers 30, and by a hand brake lever 31 pivotably mounted at the upper end of our steering lever 30, all operated by the front occupant.

Both of the front foot pedal levers 14a, 14b are pivotably mounted about a shaft 32 fixed to the chassis 2 and each coupled by a crank arm 34a, 34b to a crank shaft 36. Each of the foot pedal levers 14a, 14b includes a motion converting mechanism which converts the reciprocatory movements of the front pedals 12a, 12b to a rotary motion of the crank shaft 36. Similarly, the rear foot pedal levers 18a, 18b are pivotably mounted to a shaft 38 and are coupled by crank arms 40a, 40b to convert the reciprocatory movements of the rear foot pedals to a rotary movement of a rear crank shaft 42; and the hand levers 20a, 20b operated by the rear occupant are pivotably mounted to a shaft 44 coupled by crank arms 46a, 46b to the rear crank shaft 42. These foot pedal levers and hand levers, as well as the manual control levers 22, 26 and steering rod 30, are all located and designed to facilitate entry and exit of the two occupants.

As shown in FIG. 3, the front crank shaft 36 drives a one-way clutch 48 via a direction-control device, generally designated 50. The main function of the latter device is to permit the crank shaft 36 to be freely rotated in one direction (that in which the torque is transmitted by clutch 48 to the rear wheel 6) but only for a partial revolution in the opposite direction (that in which the torque is not transmitted by clutch 48), in order to permit the front occupant to manipulate the foot pedals 12a, 12b to a position, such as at the beginning of a forward stroke, wherein more force can be applied by his feet to the foot pedals.

One-way clutch 48 is coupled, via sprocket chain 52, guide wheels 53, sprocket wheels 54 and 55, sprocket chain 56 and sprocket wheel 57, to the input shaft 59 of a variable transmission, generally designated 60. Input shaft 59 of variable transmission 60 also includes a sprocket wheel 61 coupled by a chain 62, sprocket wheel 63, shaft 64, sprocket wheel 65, chain 66 and sprocket wheel 67 to the rear foot pedals 16a, 16b and hand levers 20a, 20b.

The output of the continuously variable transmission 60 is transmitted via output shaft 68 and sprocket chain 69 to a stepped-gear transmission, generally designated 70. The latter transmission may be of any of the known conventional constructions, including a plurality of gears selectively made operative to vary the transmission in a plurality of distinct steps so as to provide a selected gear ratio to the rear wheel 6 of the vehicle.

Manual control levers 22 and 26 control not only the transmissions 60 and 70, but also friction clutch 76 just rearwardly of the rear wheel 6. Friction clutch 76, among other functions, permits operation of electrical appliances with which the vehicle is equipped while the vehicle is stationary or coasting. For this purpose, the vehicle is equipped with a generator 72 driven by the input shaft 59 to transmission 60 via sprocket wheel 74 and chain 75. Friction clutch 76, also controlled by the manual control levers 22, 26, decouples the rear wheel 6 from the transmission, e.g. to control the gear transmission 70 and/or the continuously variable transmission 60, while the vehicle is stationary. These control levers, particularly control lever 22, also enable the operator to actuate reverse gear 77 in order to reverse the direction of travel of the vehicle, and a disc brake 78 (FIGS. 1, 2), or any other conventional brake, for each of the three wheels for braking the vehicle.

The illustrated vehicle further includes a flywheel (not shown) fixed to the front crank shaft 36.

Further details of the construction and operation of the overall vehicle are not necessary for an understanding of the present invention but are available in the above-cited patent application Ser. No.06/809,387.

The present invention is primarily directed to providing a vehicle in general, and the illustrated human-powered vehicle in particular, with a number of additional features and controls concerned mainly with steering and banking the vehicle, in order to improve its stability during steering. The additional features are also directed to enhancing the shock absorber and rear-suspension characteristics of the vehicle, to vary them in accordance with the load applied to the vehicle, and to the mounting of the rear wheel of the vehicle in order to better assure it maintains contact with pavement during the braking action. The elements added to the vehicle of the above-cited patent application Ser. No. 06/809,387, or otherwise not specifically described therein, in order to implement the foregoing new features, are identified in the drawings primarily by reference numerals starting with "400".

Steering and Banking Control

Figure 11A:
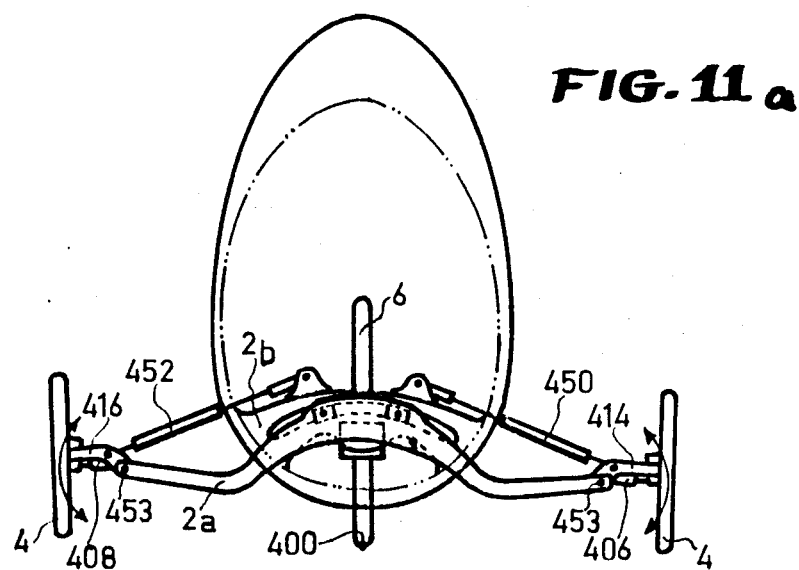
FIGS. 11a and 11b are diagrammatic front views illustrating the operation of the steering and banking controls.
Figure 11B:
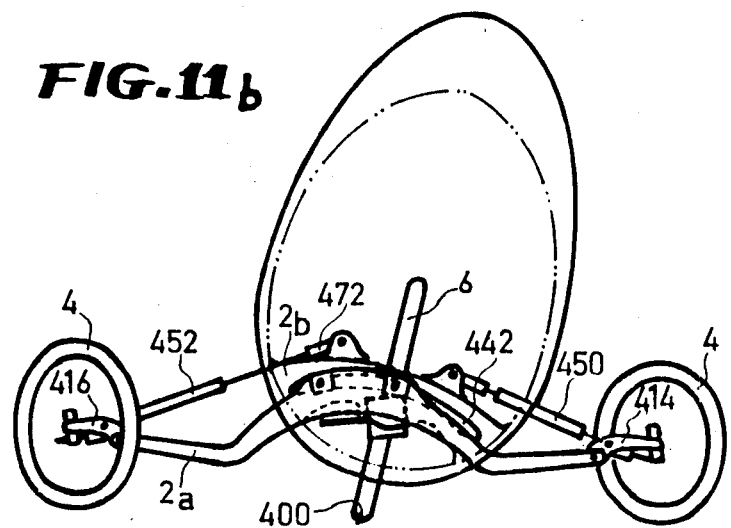

As shown particularly in FIGS. 11a and 11b, the chassis 2 includes a fixed chassis section 2a and a rotatable chassis section 2b rotatable with respect to chassis section 2a about a horizontal axis, namely the longitudinal axis 400 of the vehicle or an axis parallel thereto. The two front wheels 4 are turnably mounted to the fixed chassis section 2a about a substantially vertical axis in order to steer the vehicle; and the rotatable chassis section 2b is automatically rotated with respect to the fixed chassis section 2a about longitudinal axis 400 in the direction in which the front wheels 4 are turned when steering the vehicle.

Steering the vehicle is effected by a pair of steering levers 30 pivotably mounted on opposite sides of the front seat 8. The two levers are both moved in opposite directions when steering the vehicle. For example, if the vehicle is to be turned rightwardly, the right lever (shown at 30b in FIG. 16), is moved rearwardly, and the left lever (30a, FIG. 16 is moved forwardly. These levers control a hydraulic system which effects the steering of the two front wheels 4, and at the same time causes the rotatable chassis section 2b to rotate about the longitudinal axis of the vehicle with respect to the fixed chassis section 2a in the direction in which the wheels are turned. Each steering lever 30a, 30b includes a brake lever 31.

The hydraulic system for both turning the wheels and banking the chassis comprises two hydraulic motors, 402, 404, as shown particularly in FIGS. 4 and 16. Hydraulic motor 402 serves as the banking actuator for rotating the rotatable chassis 2b, and hydraulic motor 404 controls a pair of further hydraulic motors, 406, 408 which turn the steering wheels 4 about king pins 410 and 412, respectively. The latter king pins are carried by a pair of yokes, 414, 416 pivotably mounted at the ends of the fixed chassis section 2a, by pivots 453. Yokes 414, 416 also carry the wheels 4 by means of connecting rods 418, 420 which are turnable by the steering actuators 406, 408.

Each of the steering actuators 406, 408 includes a cylinder secured at one end to a tie rod 422 connected across its respective yoke 414, 416, and a piston having a stem 426, 428 projecting from the opposite end of the cylinder and coupled to its respective connector rod 418, 420. The arrangement is such that moving the piston in one direction causes its stem to turn its respective wheel 4 about its respective king pin 410, 412.

For purposes of banking the rotatable chassis 2b with respect to chassis 2a, the fixed chassis includes two spaced frame sections 430, 432 connected together by a plurality of tie rods 434. The rotatable chassis 2b includes a lower frame member 436, and an upper frame member 438 both of a generally open rectangular configuration and secured at their four corners by ears 440. The confronting faces of the two frame members 436, 438 are shaped such that, when secured together (FIGS. 5 and 7), they define two curved slots 442 which are aligned with each other and extend in the transverse direction of the vehicle.

Two of the tie rods 434 joining the two fixed frame sections 430, 432 each carries a pair of roller bearings blocks 444 received within slots 442 and thereby rotatably supporting the rotatable chassis section 2b on the fixed chassis section 2a. Each of the two hydraulic motors 402, 404 includes a cylinder and a piston. The two cylinders are rigidly secured together by a pair of plates 446 at their opposite ends, and are also secured to the lower frame member 436 of the rotatable chassis section 2b by a pair of stub shafts 448(FIGS. 5, 6). Each of the cylinders of the two hydraulic motors 402, 404 further includes a piston having a stem, as shown at 402a and 404a, projecting through the end plates 446 and coupled at their opposite ends to a further tie rod 434a fixed between the frame members 430, 432 of the fixed chassis section 2a.

As will be described more particularly below, the introduction or removal of hydraulic fluid with respect to the hydraulic motors 402, 404 displaces their respective pistons, but since the pistons are fixed to the fixed chassis section 2a, their respective cylinders, coupled to the lower frame member 436 of the rotatable chassis section 2b, effect the rotation of the rotatable chassis section with respect to the fixed chassis section.

A pair of shock absorbers 450, 452 are provided at the opposite ends of the rotatable chassis section 2b to cushion the banking movements of that section. Shock absorbers 450, 452 are also hydraulic devices. Each includes a cylinder having a plurality of pistons therein, as will be described below, particularly with respect to FIGS. 9 and 10. One piston stem, 450a, 452a, projects from one end of the shock absorber and is coupled to one of the two tie rods, 422, 424 of the respective yoke 414; and another piston stem, 450b, 452b, projects from the opposite end of the shock absorber cylinder and is coupled to additional tie rods, 452, 454 secured to the upper frame member 438 of the rotatable chassis section 2b.

Figure 9:
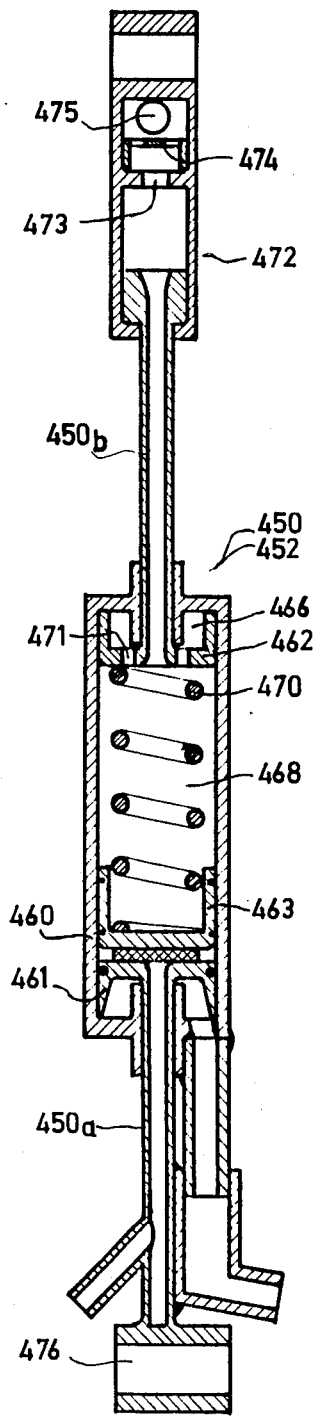
FIG. 9 is a sectional view illustrating the structure of the shock absorber in the banking control of FIGS. 4–6.
Figure 10:
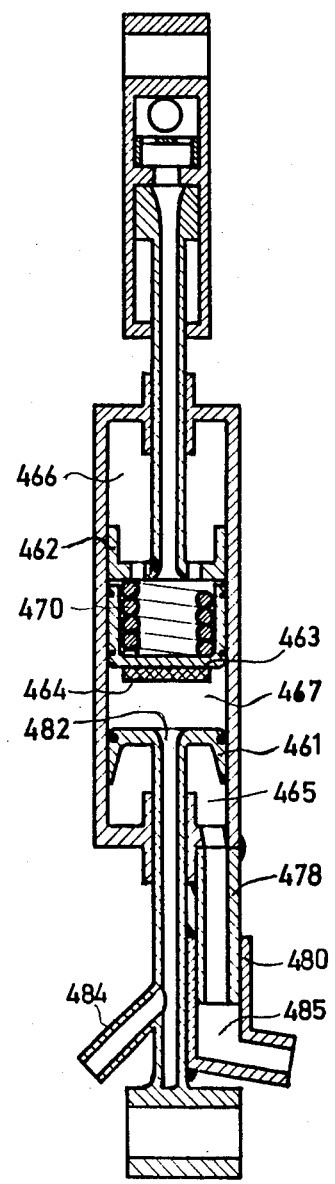
FIG. 10 is a view similar to that of FIG. 9 but showing the shock absorber in its retracted condition.

The two shock absorbers 450, 452 are of the same construction, as illustrated in FIGS. 9 and 10 with respect to shock absorber 450.

Thus, shock absorber 450 includes a cylinder 460 having a first piston 461 adjacent to one end wall and formed with stem 450a projecting therethrough, and a second piston 462 adjacent to the opposite end wall and formed with stem 450b projecting therethrough. Cylinder 460 includes a third piston 463 between the other two pistons and having a rubber faced disc 464 facing piston 461 for cushioning purposes.

It will thus be seen that the three pistons divide the interior of cylinder 460 into four chambers, namely: chamber 465 between piston 461 and its end wall, air chamber 466 between piston 462 and its end wall, air chamber 467 between pistons 461 and 463, and air chamber 468 between pistons 462 and 463.

A coil spring 470 is disposed within chamber 468 between pistons 462 and 463. Chamber 468 is vented to the atmosphere via a plurality of bores 471 formed through piston 462 and through its stem 450b. The outer end of the stem 450b is slidably coupled to an extension 472 formed with a bore 473 communicating with the atmosphere via a filter 474 and an opening 475. The end of extension 472 is formed with a bore 476 for coupling to tie rod 422. Chamber 466 is also vented to the atmosphere via openings 471 formed in piston 462 and chamber 468. It will thus be seen that chambers 466 and 468 are both air chambers.

Chambers 465, however, on the opposite side of cylinder 460 is vented to the pipe 478 slidably received within an extension 480 formed with a bore 485, connected to a venting arrangement 457 illustrated in FIG. 16, including a one-way-valve and orifice. Venting arrangement 457 permits fast, unrestricted inletting from the atmosphere througha filter 474 when a front wheel encounters an obstacle (as shown by the arcuate path of wheel 4 around pivot 453 in FIG. 11a) but only a slow restricted outletting of the air through orifice 480b to the atmosphere.

Oil chamber 467 between pistons 461 and 463 best seen in FIG. 10, communicates via a bore 482 and conduit 484, with a liquid reservoir 486 coupled to the rear vehicle seat 10, such that the weight of the occupant of the rear vehicle seat expands chamber 467 by moving piston 463 to contract a spring 470, and thereby stiffens the shock absorbing action produced by that spring. The end of piston stem 450a is formed with a bore 476 for receiving tie rod 422 (FIG. 4) of yoke 414 of the steering wheel assembly.

As will be described more particularly below with respect to the description of FIG. 16 and the overall operation of the vehicle, the banking movements of the rotatable chassis section 2b are cushioned by spring 470 in the two shock absorbers 450 and 452; but this cushioning action is directly influenced by the weight carried by the vehicle, particularly the weight applied to the rear vehicle seat 10. Thus, when the rear vehicle seat is not occupied, oil chamber 468 is contracted, whereby spring 470 in chamber 468 is expanded (this being the condition illustrated in FIG. 9), so that spring 470 applies a relatively small force to cushion the banking action; however, when the rear seat 10 is occupied, hydraulic liquid is forced from the reservoir 486 (FIG. 16) coupled to the rear seat 10 to expand chamber 467, thereby contracting and stiffening the cushioning action of spring 470.

FIG. 10 illustrates shock absorber 450 in this stiffened condition of spring 470 where the rear vehicle seat is occupied, and the rotatable chassis section 2b is banked against the spring. In condition illustrated in FIG. 10, piston 461 has been moved against the action of spring 470 to absorb a shock applied to the respective vehicle wheel 4.

As shown in FIG. 11a, when the two steered wheels 4 are oriented to travel a stright course, the rotatable chassis section 2b is disposed in its centre position with respect to the fixed chassis section 2a, so that no banking occurs. However, when steering levers 30 are moved to turn the steering wheels 4, the rotatable chassis section 2b is rotated around axis 400, on the fixed chassis section 2a, the rotational movement being permitted by bearings 444 moving within curved slots 442 to bank the rotatable chassis section 2b in the direction of turning the wheels, this banking movement of chassis section 2b being cushioned by the shock absorbers 450, 452.

While spring 470 also absorbs shocks, its main purpose in restoring the vehicle chassis to its upright position at the end of a banking operation. Thus, during the banking operation the spring is compressed to store energy, and at the end of the banking operation, this stored energy assists in restoring the vehicle chassis to its upright position, thereby relieving the driver of the considerable effort which would otherwise be required if spring 470 was not present. In this respect, it is to be borne in mind that the illustrated vehicle is intended for universal use, including women and older persons.

The operation of the steering and banking mechanisms, as well as of the shock absorbers, will be described more particularly below with respect to the description of FIG. 16 and the overall operation of the vehicle.

Rear Seat Mounting

Figure 12:
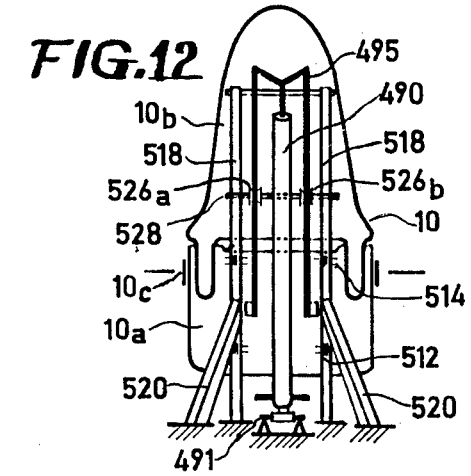
FIGS. 12 and 13 are rear and side views, respectively, of the rear vehicle seat and its hydraulic suspension.
Figure 13:
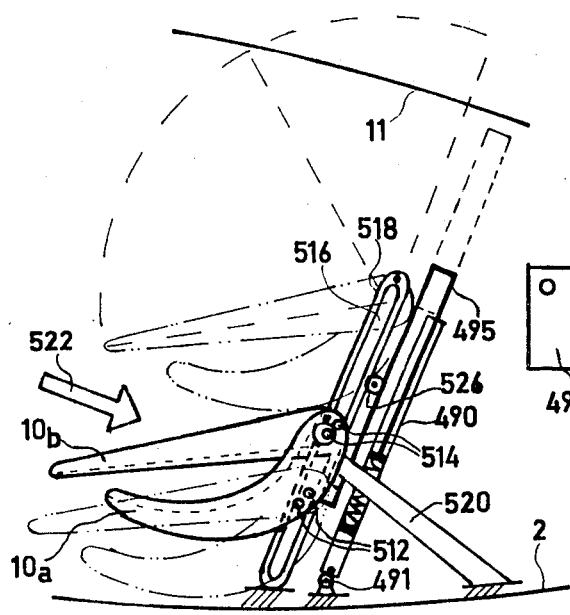
Figure 14:
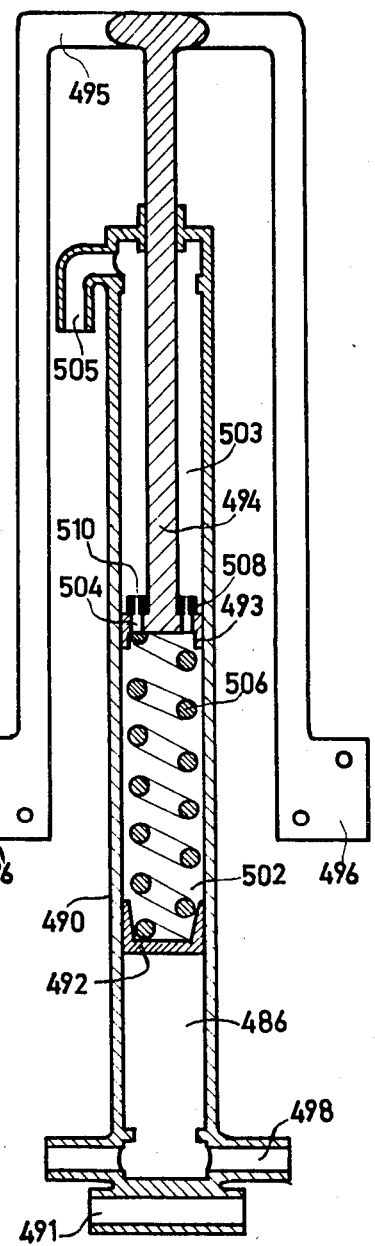
FIG. 14 is an enlarged sectional view of the rear seat suspension.

FIGS. 12-14 illustrate the mounting of the rear seat 10. As indicated earlier, rear seat 10 is coupled to the reservoir 486 (FIG. 16) which stiffens the cushioning action of spring 470 in the shock absorbers 450, 452 when the rear seat is occupied, and loosens the action of the spring when the rear vehicle seat is not occupied.

Reservoir 486, connected to chamber 467 of the shock absorbers 450, 452, is part of a cylinder 490 pivotably mounted at one end 491 (FIG. 14) to the rotatable chassis section 2b of the vehicle just at the rear of the rear seat 10. Cylinder 490 includes two pistons 492, 493. Piston 493 includes a stem 494 projecting through the opposite ends of cylinder 490 and secured to a bail 495 formed with a pair of lugs 496 fastened to the back of the rear seat 10.

Piston 492 defines, with one end of cylinder 490, chamber 486 serving as the liquid reservoir for chamber 467 of the two shock absorbers 450, 452. Chamber 486 includes port 498 connected via a valve assembly 500 (FIG. 16) to the conduits 484 of the two shock absorbers. A second chamber 502 (FIG. 14) is formed within cylinder 490 by the two pistons 492, 493; and a third chamber 503 is formed between piston 493 and the end wall of the cylinder. The latter two chambers are air chambers and are vented to the atmosphere via openings 504 formed in piston 493, and a vent 505 formed at the end of cylinder 490. A coil spring 506 is disposed within chamber 502, and a disc 508 is slidably receivable over stem 494 in the chamber 503 so as to overlie the openings 504 formed through the stem.

Openings 504 formed in the stem are of relatively large cross sectional area, whereas openings 510 formed in disc 508 are of relatively small cross sectional area. Thus, when piston 493 moves downwardly within cylinder 490, a flow of air is produced through opening 504 from chamber 502 into chamber 503, lifting disc 508 from contact with piston 493, thereby permitting a large flow of air to pass through openings 504 from chamber 502 into chamber 503. However, when piston 493 is moved upwardly, the flow of air from chamber 503 into 502 moves disc 508 into contact with piston 493, so that openings 510 in the disc are effective to restrict the flow of air from chamber 503 into 502, thereby reducing the flow of air in this direction.

The rear seat 10 includes a lower horizontal seat section 10a (FIGS. 10, 12) and an upper back section 10b pivotably mounted thereto at 10c. Sections 10a is formed with rollers 512, 514, (FIGS. 12, 13) receivable in a slot 516 formed in a pair of framed members 518. The latter frame members are supported in an inclined position by a pair of further frame members 520, permitting both seat sections to move downwardly along frame member 518 according to the weight of the occupant on the lower seat section 10a. When the lower seat section 10a is thus occupied by a rear seat occupant, the lower seat section 10a moves downwardly. The rigid connection with bail 495 to piston stem 494, moves piston 493 also downwardly within cylinder 490. This downward movement of piston 493 contracts spring 506 which thereby moves piston 492 downwardly within chamber 486 to force liquid from that chamber via port 498 and valve assembly 500 (FIG. 16) to conduits 484 leading to chamber 467 of the two shock absorbers 450, 452.

Two rollers, shown at 526a, 526b in FIG. 12 and at 526 in FIG. 13, are carried by a shaft 528 secured across frame member 518. These rollers bear against the two arms of bail 495 to guide the movements of the bail, and its piston 493, with respect to cylinder 490.

It will thus be seen that when seat section 10a is not occupied, it will be in its higher position as illustrated in FIG. 13, whereby chamber 486 of cylinder 490 will be in its expanded condition so that chamber 467 of the two shock absorbers 450, 452 will be in the contracted condition, as illustrated in FIG. 9. Springs 470 of the two shock absorbers will therefore be in their expanded condition such that the force applied by them during the operation of the shock absorbers will be rather light. However, when the seat section 10a of the rear seat 10 is occupied, the weight of the occupant will move seat section 10a downwardly, thereby contracting spring 506 in cylinder 490 causing it to contract liquid chamber 486 of that cylinder; this forces liquid from that chamber into chamber 467 of the two shock absorbers 450, 452, expanding that chamber so as to contract springs 470 of the shock absorbers. This stiffens the shock absorbing action produced by these shock absorbers during a banking operation when the rotatable chassis section 2b is rotated with respect to the fixed chassis section 2a.

As described earlier, while spring 470 performs a shock-absorbing function, its main purpose is to aid in restoring the vehicle chassis to its vertical position at the end of a banking operation, thereby relieving the operator of this effort which would otherwise be required.

Pivotably mounting the upper back section 10b with respect to the lower seat section 10a provides a number of advantages: Thus, when the lower seat section 10a is not occupied, the back section 10b would be pivoted downwardly, as shown in the upper phantom-line positions of the two seat sections 10a, 10b, to permit the roof of the outer shell 11 to be lower at this rear end of the vehicle. In addition, the folded position of the back section 10b of the rear seat 10, when the rear seat is not occupied, increases the view by the front seat occupant of the rear of the vehicle. When the rear seat is to be occupied, the occupant first pivots the back section 10b upwardly to enable him to sit on seat section 10a, whereby his weight lowers the seat section while the pivotable movement of the back section is completed. The weight of the occupant thereby causes the two sections 10a, 10b of the rear seat 10 to move downwardly to contract chamber 486 in cylinder 490 and thereby to stiffen the cushioning effect of the two shock absorbers 450, 452 during a banking up operation as described above.

Frame members 518 are formed with the long slots 516 in which rollers 512, 514 move, thus carry all the loads which are not directed parallel to the longitudinal axis of cylinder 490. As a result, piston stem 494 may move within cylinder 490 without any significant tension, particularly since cylinder 490 is connected to the cassis by means of the pivotable coupling 491.

In the open, operative position of the two seat sections 10a, 10b, frame members 518, 520 support the seat back section 10b at an angle of approximately 60 degrees is respect to the horizontal axis of the vehicle. This positions the back section of the rear seat 10 approximately 90 degrees with respect to the reaction forces, indicated by arrow 522 in FIG. 13, produced by the rear occupant, when in the supreme position illustrated in FIG. 1, when using his feet to oscillate the foot pedals 16a, 16b for aiding the front seat occupant to propel the vehicle. This arrangement maximizes the energy applied by the rear occupant for propelling the vehicle and prevents loss of propulsion energy by unnecessary movements of the rear seat.

Hydraulic Suspension of Rear Wheel 6.

The hydraulic suspension of the rear wheel 6 is illustrated in FIG. 3, and its operation is more particularly described in the diagrams of 15a and 15b. Briefly, the hydraulic suspension of the rear wheel is effective not only to absorb shocks applied to the rear wheel during the propulsion of the vehicle, but also to move the rear wheel downwardly with respect to the vehicle chassis during a braking operation in order to maintain firm contact with the road since the rear end of the vehicle tends to move upwardly during such an operation. In addition, as shown in FIG. 16 and as will be described more particularly below with respect to the overall operation of the vehicle, the hydraulic suspension 7 of the rear wheel 6 is also connected via valve assembly 500 to the liquid reservoir 486 of the rear seat cylinder 490 so as to be stiffened when the rear seat is occupied, and to be loosened when it is not occupied.

As shown in FIGS. 1, 2, 3, 15a, and 15b, hydraulic suspension 7 includes a u-shaped cylinder 530 pivotably mounted by a pair of pins 532 to the rotatable chassis section 2b so as to pivot about a horizontal axis. Each of the two parallel legs of the U-shaped cylinder 530 receives a piston having a stem 534 projecting from the end of the respective cylinder section and coupled to a shaft 536 pivotably mounted to one end of a pair of lever arms 538. The opposite ends of the lever arms are pivotably mounted to shaft 540 rotated by sprocket wheel 542 of the transmission when clutch 76 is engaged. Sprocket chain 554 of the transmission is passed around a pair of rollers 546, 548. These rollers, as well as sprocket 542 are fixed to the rotatable chassis section 2b.

Sprocket wheel 542 transmits the torque to rear wheel 6 via chain 554, shaft 540, sprocket 553, chain 557 and sprocket 559.

The rear axle 536 of the rear wheel 6 is also coupled to a disc brake 550 effective, when the brake is actuated, to brake the rotation of the rear axle 536.

It will thus be seen that the hydraulic suspension 7 of the rear wheel 6 is pivotably supported from the rotatable chassis section 2b by pins 532 engageable with the opposite sides of the lower ends of the two cylinder sections 530, and by shaft 540 pivotably mounting the pair of arms 538 supporting the rear axle 536. During the operation of the vehicle when disc brake 78 is not actuated to brake the rear wheel 6, the two lever arms 538 form a small angle ($\alpha$) with the horizontal axis, as shown in FIG. 15a, whereupon the rear wheel 6 is in a relatively raised position with respect to the vehicle chassis. However, when disc break 78 is actuated to brake the rear wheel 6, the reaction forces, indicated by arrow 544 in FIG. 15b, are effective to produce a component of force to pivot wheel 6 downwardly, thereby increasing the angle between lever arms 538 and the horizontal axis (as shown at ($\beta$) in FIG. 15b), thereby lowering the rear wheel with respect to the vehicle chassis. Thus, during the braking action, the rear wheel 6 is lowered to maintain its contact with the road and to thereby counteract the tendency of the rear end of the vehicle to rise.

As shown in FIG. 16, pistons 534 displaceable within the two legs of cylinder 530 divide the interior of each leg into two compartments, namely an upper compartment 530a and a lower compartment 530b. The two upper compartments 530a communicate with each other via the bridge of the U-shaped cylinder 530, and with the liquid reservoir 486 of the rear seat 6 via conduit 560, a valve assembly 562 and the previously mentioned valve assembly 500. Each of the lower compartments 530b is vented to the atmosphere, while each of compartments 530a, contains a coil spring 564. As will be described below, with respect to the description of FIG. 16 and of the overall operation, the stiffness of the springs 564 in absorbing the shocks encountered by the rear wheel 6 is dependent on the weight applied to the rear vehicle seat 10. Thus, when the rear vehicle sent is unoccupied, less liquid is transferred from the seat reservoir 486 to the upper compartments 530a of the two cylinder legs 530, thereby relaxing springs 564, so that the springs apply a relatively light force to cushion the shocks encountered by the rear wheel 6. However, when the rear vehicle seat 10 is occupied, the weight applied to the vehicle seat forces liquid from the seat reservoir 446, via valve assemblies 500 and 562, into the upper compartments 530a of the two cylinders 530, thereby stressing the two springs 564 so as to stiffen the cushioning effect produced by them.

The purposes of valve assemblies 500 and 562 are described below with respect to the description of FIG. 16 and the overall operation of the illustrated hydraulic system.

Overall Operation.

The overall operation of the described system will be best understood by reference to both FIG. 16 illustrating the hydraulic system, and FIG. 17 illustrating the electrical circuit for controlling valve assembly 500 in the hydraulic system. In FIG. 16, the connection points of the various elements to the vehicle frame are shown by simple diagonal lines to indicate the connections to the upper frame section 2b, and crossed diagonal lines to indicate a connection to the lower frame section 2a. In addition, conventional arrows indicate mechanical force direction, and air heads alone indicate oil flow direction.

With reference first to FIG. 17, the electrical system therein illustrated is for controlling valve assembly 500, which is a two-position solenoid valve. It is normally retained in its P-position by a spring 570, and is movable to its Q-position when its solenoid 572 is energized. The circuit for energizing solenoid 572 includes a rear door switch 574 and a foot switch 576 connecting the solenoid to the vehicle battery 578. Switch 574 is normally open, but is automatically closed when the rear door is opened; and switch 576 is normally closed, but is automatically opened when the rear occupant applies one foot to a foot pedal e.g., 16b for aiding in propelling the vehicle.

The arrangement is such, as will be described more particularly below, that when the rear occupant opens the rear door in order to enter the vehicle, solenoid valve 500 is actuated to its Q-position connecting the rear seat reservoir 486 via conduits 484 to chamber 467 in each of the two shock absorbers 450, 452 (FIGS. 10, 16), so that when the rear occupant sits in the rear seat, the rear seat section 10a descends according to the weight of the occupant. This moves piston 492 (FIG. 14) dowwnardly, and thereby pumps liquid from the oil reservoir 486 into the shock absorber chambers 467, in order to stiffen the shock absorbing springs 470. When the rear occupant applies a foot to the foot pedal equipped with the foot switch 576, the later switch is opened, thereby actuating valve assembly 500 to its P-position, terminating the connection of the rear seat reservoir 486 with the shock absorber chambers 467. This presets the characteristics of the shock absorbers 450, 452, according to the weight carried by the rear vehicle seat. In this P-position of valve assembly 500, the two shock absorbers 450, 452 are disxconnected from each other and from the oil reservoir 486, so that the preset condition of the shock absorbers remains thereafter. Thus, if the rear seat is occupied, the two shock absorbers 450, 452 would be "stiffened" by the flow of oil from reservoir 486 to the two shock absorbers, and this stiffened condition of the shock absorber remains thereafter until the rear occupant removes his foot from the foot pedal after the vehicle has come to rest and the rear occupant prepares to leave. This operation of valve assembly 500 is particularly advantageous during the banking of the vehicle.

To prevent the rear occupant from opening the door, entering, and immediately closing it without sitting on the rear seat and placing his foot on the foot pedal containing switch 576, valve assembly 500 carries a blocking member 573 which physically blocks the closing of the rear door in such a situation.

The influence of the weight carried by the rear vehicle seat on the hydraulic suspension 7 for the rear wheel 6 is just opposite to that described above with respect to the banking shock absorbers 450, 452. Thus, before the occupant opens the rear door, the solenoid valve is in its P-position, connecting the rear seat reservoir 486 with cylinders 530 of the hydraulic suspension 7 for the rear wheel 6. As soon as the rear door is opened, valve 500 is actuated to its Q-position terminating this connection between reservoir 486 and cylinders 530. However as soon as the occupant places his foot on the foot pedal carrying switch 576, preparatory to propelling the vehicle, the foot switch is opened, thereby de-energizing solenoid 572 to permit valve 500 to return to its P-position. This re-establishes communication between the rear seat reservoir 486 and the cylinders 530 of the hydraulic suspension 7, so that during the operation of the vehicle, the stiffness of the shock absorbing springs 564 increases with the weight applied to the rear vehicle seat 10.

Valve assembly 562 between the rear wheel hydraulic suspension 7 and valve assembly 500, permits a substantially unrestricted flow of liquid, via check valve 562a, into cylinder 486, but a restricted flow, via restriction 562b out of the cylinders. Thus, when rear wheel 6 encounters an obstacle, the rear wheel will be permitted to move upwardly quickly, but as soon as the rear wheel has passed the obstacle, it will be permitted to return downwardly very slowly.

More particularly, when the rear wheel encounters an obstacle, reservoir spring 506 is sharply retracted, which produces a fast passage of air from chamber 562 to chamber 503. However, because of valve assembly 524 of the reservoir, piston 493 can move only slowly and limitedly in the upward direction. As a result, the fast passage of air from chamber 502 to chamber 503 causes an almost immediate balance of pressures on both sides of piston 493, which retards any tendency of the piston to move. The final result is that, upon encountering an obstacle, the rear occupant's seat moves very little.

When the obstacle has been traversed, piston 493 moves downwardly at a slow rate, if at all, due to the action of the rear wheel valve assembly 562 cooperating with the action of the perforated disc 508 restricting the expansion of spring 506. Thus, the rear vehicle seat also moves relatively little if when the rear wheel has traversed the obstacle, so that the rear occupant enjoys a substantially smooth and cushioned ride.

During the operation of the vehicle, steering is effected by the front occupant who grasps the two steering rods 30a, 30b and moves them in opposite directions. As shown in FIG. 16, the two steering rods 30a, 30b are each coupled to a piston 580 movable within a cylinder 582 pivotably mounted to the rotatable chassis section 2b. Thus, if the two steering rods 30a, 30b are moved in the direction of the arrows in FIG. 16, piston 580b is moved downwardly and piston 580a is moved upwardly. The two cylinders 582a, 582b are hydraulically connected to the opposite sides of piston 402a of the banking hydraulic motor 402. Since cylinder 402b of hydraulic motor 402 is fixed by shafts 448 (FIG. 4–6) to the rotatable chassis section 2b, whereas the opposite end of its piston 402a is secured to tie rod 434a secured to the fixed chassis section 2a, the rotatable chassis section 2b will rotate with respect to the fixed chassis section 2a. This rotation is permitted by bearings blocks 444 (FIGS. 4–8) carried by the tie rods 434 of the fixed chassis section 2a moving within the curved slots 442 defined by the rotatable chassis section 2b.

It will thus be seen that moving the two steering rods 30a, 30b in opposite directions will produce a boosting force via chambers 582a, 582b. This is particularly significant when restoring the vehicle from a banking operation.

Since cylinder 404b of the hydraluic steering motor 404 is rigidly coupled to cylinder 402b, and since one end of its piston 404a is pivotally mounted to rod 434a, the latter cylinder will also move with cylinder 402b, thereby forcing liquid in the direction of the arrows to the two steering actuators 406, 408. Thus, the liquid flows into the right sides of both steering actuators 406, 408 and flows out of the left side, thereby moving the pistons 426, 428 carried by the two actuators in the same direction (leftwardly in FIG. 16). However, it is to be noted that piston stem 426 passes through the left side of actuator 406, whereas piston stem 428 passes through the right side of this actuator 408. Accordingly, the volume of the left side of actuator 406 is reduced, as compared to that at the right side, by the volume of the piston stem passing through the left side of the actuator; whereas the volume of the right side of the actuator 408 is reduced by the volume of the piston stem 428 passing through it. Since the right chamber of the right actuator 408 is therefore of smaller volume than the right chamber in actuator 406, the movement of piston 428 will be slightly faster than the movement of piston 426. Thus the turning of the right wheel 4, which is at the inside of a turn, will be slightly ahead of the turning of the left wheel 4 at the outside of the turn.

It will thus be seen, as shown particularly in FIGS. 11a and 11b, that when the wheels 4 are turned by the operation of the steering levers 30a, 30b, the rotatable chassis section 2b is also rotated with respect to the fixed chassis section 2a in the direction of the turn, thereby banking the rotatable chassis section during this turn. The vehicle seats 8, 10, as well as the vehicle enclosure 11, are all supported by the rotatable chassis section 2b, so that they will all bank in the direction of the turn.

The banking movement of the rotational chassis section 2b follows the curve of slot 442. preferably, this slot has a center of curvature which is approximately at a point of contact of the vehicle wheel 6 with the plane of the road pavement. Normally, extension 472 of the shock absorber is in its retracted condition as illustrated in FIG. 10, and remains the same during most banking operations. However, during an extreme banking, the extension extends to the position illustrated in FIG. 9.

As pointed out earlier, the cylinders of the banking actuator 402 and steering actuator 404 are integrally connected together by side plates 446. This assures that synchronization will always be maintained between the steering and banking movements.

The banking movements are absorbed by the two shock absorbers 450, 452. As described earlier, spring 470 performs some absorbtion but its main function is to aid in restoring the vehicle chassis to its vertical position at the end of a banking operation. As also described earlier, when the rear vehicle seat 10 is occupied, its reservoir 486 is contracted so as to transfer liquid via port 487 (FIGS. 14, 16) to chambers 467 of the two shock absorbers 450, 452, thereby stiffening the action of the spring 470 in each shock absorber. The cushioning of the banking action thus depends on the load carried by the vehicle rear seat, particularly the weight of the rear seat occupant.

When the stiffness of the shock absorbing spring 470 has been preset by the weight on the rear seat 10 as described above, any shocks applied to the front wheels 4 will be absorbed by the shock absorbers 450, 452 as controlled by the valve assembly 457 (FIG. 16) communicating with chambers 465 of the shock absorbers via their ports 478. Thus, when a wheel encounters an obstacle, a check valve 457a of valve assembly 457 permits a rapid inletting of air to chamber 465; and when the obstacle has been traversed, a slow restriction 480b permits a restricted flow of air back out of the chamber.

The rear seat section 10a is similarly cushioned against shocks by spring 506 (FIG. 14) disposed within cylinder 490. Thus, when an obstacle is encountered, piston 492 within cylinder 490 is moved sharply upwardly, against the action of the cushioning spring 506. As described earlier when the rear seat is occupied, this upward movement lifts disc 508 from the upper surface of piston 493, thereby permitting a rapid discharge of air from chamber 502 to the atmosphere via chamber 503 and vent 505; however, when the obstacle has been traversed, the movement of piston 492 downwardly by the stressed spring 506 produces a flow of air into chamber 502, which draws disc 508 against the upper surface of piston 493, whereby the flow of air into chamber 502 is restricted, thereby producing a gradual restoration of the seat.

During the normal operation of the vehicle, rear wheel 6 is suspended by the hydraulic suspension 7 such that the springs 564 within the two cylinder legs 530 of the suspension absorb shocks applied to the rear wheel. During this normal operation of the vehicle, the rear wheel 6 is supported in the position illustrated in FIG. 15a by pins pivotably mounting the hydraulic suspension 7 to the movable chassis section 2b, and by the pivotable mounting of the rear wheel axle 536 to the movable frame section 2b by lever arms 538, such that a small angle (indicated as (α) in FIG. 15a), is formed between lever arms 538 and the horizontal axis. However, when the rear wheel 6 is braked, by the actuation of brake 78 (FIGS. 1, 2, 15a, 15b), the reaction forces occuring during braking, indicated by arrow 544 in FIG. 15b, pivot the hydraulic suspension 7 to the position illustrated in FIG. 15b, wherein the angle (α) between lever arm 538 and the horizontal axis is increased to ($\beta$). As a result, the rear wheel 6 is lowered with respect to the tendency of the rear of the vehicle to move upwardly during the braking action, thereby better assuring that the rear wheel will maintain contact with the pavement during the braking action.

During the braking action, when lever arm 538 is moved from angle ($\alpha$) to angle ($\beta$) the volume of chambers 530a of cylinder 530 is increased, drawing oil from chamber 486 of reservoir 490. This flow is permitted only at a restricted rate because of restriction 562b of valve assembly 562, thereby producing a slow and long, but firm, movement of the rear wheel downwardly of the chassis during braking.

Thus, not only does the described arrangement tend to lower the rear wheel towards the pavement in order to counteract the rear end of the vehicle to rise from the pavement during braking, but also maintains the rear occupant's centre of gravity in a relatively constant position with respect to the road, thereby contributing to the overall stability of the vehicle and comfort to its rear occupant.

With reference to FIG. 14, it is to be noted that during this braking action, spring 506 of the rear seat suspension is not caused to expand or retract, and the two pistons 492, 493 are both sliding downwardly, permitting the outside air to enter freely to the expanding chamber 503 through check valve 524a. When the braking action is completed, lever arm 538 moves back from angle ($\alpha$) to ($\beta$), in the absence of reaction force indicated by arrow 544 (FIG. 15b). As a result, the oil passes from cylinder 530 unrestrictedly through check valve 562a to chamber 486 of the reservoir. This gradually raises rear wheel 6 with respect to the chassis, and thereby lowers the rear end of the vehicle with respect to the pavement, so that the centre of gravity of the rear occupant still remains relatively stable with respect to the road.

The air chamber 503 is now outletted to the atmosphere, but this time at a restricted rate as controlled by orifice 524b.

While the invention has been described with respect to a preferred embodiment, it will be appreciated that this embodiment is set forth purely for purposes of example, and that many variations, modifications and other applications of the invention may be made.

What is claimed is:

1. A road vehicle including:
   a chassis supported by at least three wheels, at least one of which is a steered wheel and at least one of which is a non-steered wheel;
   said chassis including a fixed chassis section and a rotatable chassis section rotatable with respect to said fixed section about a horizontal axis parallel to the longitudinal axis of the vehicle;
   said steered wheel being carried by said fixed chassis section and turnably mounted about a substantially vertical axis thereof;
   said non-steered wheel being carried by said rotatable chassis section;
   steering control means for turning said steered wheel about said substantially vertical axis in order to steer the vehicle;
   and banking means controlled by said steering control means for automatically rotating said rotatable chassis section, and the non-steered wheel carried thereby, with respect to said fixed chassis section in a predetermined direction about said horizontal axis whenever the steered wheel is turned to steer the vehicle.

2. The vehicle according to claim 1, wherein said steering control means comprises a steering actuator coupled between said fixed chassis section and said steered wheel; and said banking means comprises a banking actuator coupled between said fixed chassis section and said rotatable chassis section.

3. The vehicle according to claim 2, wherein both said actuators are hydraulic actuators.

4. The vehicle according to claim 2, wherein said steered wheel is turnably mounted about the substantially vertical axis to an arm, which arm is pivotably mounted to said fixed chassis section about a horizontal axis, said steering actuator being connected between said steered wheel and said arm.

5. The vehicle according to claim 4, wherein said banking actuator is connected between said arm and said fixed chassis section and said rotatable chassis section.

6. The vehicle according to claim 5, wherein said steering actuator is a hydraulic device and said banking actuator is a hydro-pneumatic device.

7. The vehicle according to claim 6, wherein said steering control actuator and said bannking actuator are each driven by a hydraulic motor, the driven members of the two hydraulic motors being connected together by a rigid mechanical interconnection maintaining synchronization in the operation of the two motors.

8. The vehicle according to claim 2, wherein said vehicle includes two steered wheels supported at opposite ends of said fixed chassis section, said rotatable chassis section being rotatably mounted to said fixed chassis section intermediate said two steered wheels; there being two of said steering actuators, each coupled between said fixed chassis section and one of said steering wheels.

9. The vehicle according to claim 2, wherein said fixed chassis section comprises two spaced members rigidly fixed to each other by a plurality of tie rods, and said rotatable chassis section comprises two spaced members rigidly fixed to each other and formed with curved slots receiving the tie rods of said two spaced members of the fixed chassis section permitting the rotatable chassis section to rotate with respect to said fixed chassis section according to the curvature of said slots.

10. The vehicle according to claim 9, wherein said slots have a center of curvature which is approximately at a point in the plane of contact of the vehicle wheels with the road pavement.

11. The vehicle according to claim 9, wherein said tie rods of said two spaced members of the fixed chassis section include slide blocks received within the curved slots of the two spaced members of said rotatable chassis section, to rotatably mount said rotatable chassis section with respect to said fixed chassis section.

12. The vehicle according to claim 2, wherein said steering actuators comprise hydraulic devices having chambers of volumes such that the turning of the steered wheel at the inside of a turn is faster than that of the outside of the turn.

13. The vehicle according to claim 2, further including a shock absorber connecting each of the opposite sides of the rotatable chassis section with respect to the fixed chassis section; each of said shock absorbers including a spring which is loaded during the rotation of said rotatable chassis section and which aids in the restoration of the rotatable chassis section following the rotation thereof.

14. The vehicle according to claim 13, wherein said shock absorbers are hydro-pneumatic devices, and said vehicle includes a liquid reservoir for said hydro-pneumatic devices, which reservoir is coupled to the load carried by the vehicle such as to stiffen the shock absorber according to the load carried by the vehicle.

15. The vehicle according to claim 14, wherein each of said shock absorbers comprises:
a cylinder;
a first piston displaceable in said cylinder adjacent one end wall thereof and defining a first chamber therebetween;
a second piston displaceable in said cylinder and projecting through the opposite end wall of the cylinder and defining a second chamber therebetween;
said two pistons including stems projecting through the respective ends of the cylinders and coupled to the fixed and rotatable chassis sections respectively;
a third piston displaceable in said cylinder between said first and second pistons and defining a third chamber between said first and third pistons, and a fourth chamber between said second and third pistons;
a spring in said fourth chamber;
an air vent leading from said fourth chamber to the atmosphere;
an opening formed in said first piston establishing hydraulic communication between the third chamber and the said reservoir;
a first port leading to said third chamber for connection to said reservoir for stiffening the spring by the weight carried by the vehicle;
and a second port venting said first chamber to the atmosphere via an arrangement permitting inletting of the air into said first chamber but restricted outletting of the air therefrom.

16. The vehicle according to claim 14, wherein said liquid reservoir is coupled to a seat of the vehicle to stiffen the shock absorber according to the weight carried by said seat.

17. The vehicle according to claim 16, wherein said seat includes:
a cylinder closed at one end by an end wall;
a first piston movable in said cylinder towards and away from said end wall and defining therewith a chamber serving as said liquid reservoir;
a second piston movable within said cylinder and defining a second chamber with said first piston;
a spring disposed in said second chamber to absorb the shocks applied to the vehicle seat;
and means for supporting the weight of the seat occupant on said second piston such that said weight forces the hydraulic liquid out of the reservoir into said shock absorber for stiffening the spring thereof.

18. A vehicle, comprising:
a shock absorber including a spring engageable with a displaceable member for varying the force of said spring, and having an expansible liquid chamber for moving said displaceable member to vary said spring force;
a liquid reservoir supplying liquid to said liquid chamber of the shock absorber to preset said displaceable member and thereby said spring force;
and means responsive to a weight carried by said vehicle, for forcing liquid from said reservoir into said expensible liquid chamber for moving said displaceable member in order to increase said spring force with an increase in the weight carried by said vehicle.

19. The vehicle according to claim 18, wherein said means responsive to a weight carried by the vehicle comprises a seat in the vehicle and coupled to said liquid reservoir such as to move said displaceable member in accordance with the weight carried by said seat.

20. The vehicle according to claim 19, wherein said seat includes:
a cylinder closed at one end by an end wall;
a first piston movable in the cylinder towards and away from said end wall and defining therewith a chamber serving as said liquid reservoir;
a second piston movable within said cylinder and defining a second chamber with said first piston;
a spring disposed in said second chamber to absorb the shocks applied to the vehicle seat;
and means for supporting the weight of the seat occupant on said second piston such that said weight forces the hydraulic liquid out of the reservoir into said shock absorber for stiffening the spring thereof.

21. The vehicle according to claim 20, wherein said second chamber occupied by said spring is an air chamber and is vented to the said third chamber via valve means permitting unrestricted flow of the air from said second chamber, and restricted flow of the air into the said second chamber.

22. The vehicle according to claim 21, wherein said valve means comprises a passageway of large cross sectional area formed through said second piston, and a disc freely movable over the outer face of said second piston and formed with a passageway of small cross sectional area, such that when said second piston is moved inwardly of the cylinder towards the first piston, the flow of air through said large cross sectional area passageway in said second piston moves the disc away from the second piston thereby producing a large, substantially non-restricted flow of air out of the second chamber, and when the piston is moved outwardly of the cylinder, the flow of air into said second chamber presses the disc against the outer face of the second piston thereby producing a small, restricted flow of air into the chamber via said small cross sectional area pasageway through said disc.

23. The vehicle according to claim 19, wherein at least one of said vehicle wheels includes a hydraulic suspension also supplied with hydraulic liquid from said liquid reservoir coupled to said vehicle seat.

24. The vehicle according to claim 23, wherein said hydraulic suspension includes a cylinder and a piston displaceable therein and dividing the interior of the cylinder into a first chamber and a second chamber; a spring in said first chamber; a port communicating with said first chamber; and a conduit from said liquid reservoir to said port for adding liquid into said reservoir from said first chamber to stiffen the spring when the vehicle load increases, and for withdrawing liquid into said first chamber from said reservoir to loosen the spring when the load carried by the vehicle decreases.

25. The vehicle according to claim 24, wherein said conduit includes valve means for permitting only restricted flow of liquid into said first chamber but permitting unrestricted flow of liquid out of said first chamber.

26. The vehicle according to claim 23, including further valve means in said conduit establishing communication between said first chamber and said reservoir when the vehicle is occupied, and terminating said communication before the vehicle is actuated, in order to preset the spring force according to the load on the vehicle.

27. The vehicle according to claim 26, wherein said latter valve means are controlled by a first electrical switch which is actuated to terminate said communication when the vehicle door is opened, and a second electrical switch which is actuated to establish said communication before the vehicle is actuated.

28. The vehicle according to claim 27, wherein the vehicle is a foot-powered vehicle including a foot pedal, and said second electrical switch is actuated to establish the communication between said first chamber and liquid reservoir when the occupant applies his foot to the foot pedal, when the rear occupant's door is closed.

29. The vehicle according to claim 23, wherein said vehicle wheel and its hydraulic suspension are pivotably mounted at an acute angle to the horizontal axis of the vehicle such that during the braking of the vehicle, the reaction forces pivot the wheel and its hydraulic suspension in the direction increasing said acute angle, thereby lowering the vehicle wheel with respect to the vehicle body.

30. A vehicle including a rear wheel having a hydraulic suspension, and a lever arm extending rearwardly of said rear wheel at an acute angle to the horizontal axis of the vehicle, the front end of said lever arm being pivotably mounted to the axis of the rear wheel, and the rear end of the lever arm being pivotably mounted to the vehicle at a point above the axis of the rear wheel, such that during the braking of the vehicle, the reaction forces pivot the rear wheel and its hydraulic suspension in the direction increasing said acute angle, thereby lowering the rear wheel with respect to the vehicle.

* * * * *